US012695800B2

(12) United States Patent
    Tripathi et al.

(10) Patent No.: US 12,695,800 B2
(45) Date of Patent: Jul. 28, 2026

(54) APPARATUSES AND METHODS FOR FACILITATING A PATTERN-DRIVEN SCALABLE SCHEDULING FRAMEWORK FOR NETWORK GRAPH WORKLOADS

(71) Applicant: CIENA CORPORATION, Hanover, MD (US)

(72) Inventors: Pravin Tripathi, Lucknow (IN); Gurpreet Singh, Amristsar (IN); Jatin Sahni, Uttarakhand (IN)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 18/508,288

(22) Filed: Nov. 14, 2023

(65) Prior Publication Data
    US 2025/0106279 A1     Mar. 27, 2025

(30) Foreign Application Priority Data

Oct. 10, 2023    (IN) .............................. 202311064303

(51) Int. Cl.
    *H04L 67/1012*      (2022.01)
    *H04L 67/1008*      (2022.01)
    *H04L 67/1023*      (2022.01)
(52) U.S. Cl.
    CPC ...... *H04L 67/1012* (2013.01); *H04L 67/1008* (2013.01); *H04L 67/1023* (2013.01)
(58) Field of Classification Search
    None
    See application file for complete search history.

(56) References Cited

U.S. PATENT DOCUMENTS

2003/0220984 A1*  11/2003  Jones .................. H04L 63/0846
                                                        709/219
2005/0228850 A1*  10/2005  Zhu ....................... G06F 9/5005
                                                        709/200
                        (Continued)

FOREIGN PATENT DOCUMENTS

WO      WO-2023009803 A1 *  2/2023  ........... G06F 21/577

OTHER PUBLICATIONS

"Welcome to Apache Giraph!", http://giraph.apache.org, Downloaded Aug. 14, 2023, 1 page.
                        (Continued)

*Primary Examiner* — Phyllis A Book
(74) *Attorney, Agent, or Firm* — Guntin & Gust, PLC; Mark Wilinski

(57)      ABSTRACT

Aspects of the subject disclosure may include, for example, obtaining a graph, applying a first algorithm to the graph to obtain at least one elementary path, applying a rule to each of the at least one elementary path to obtain a respective sanitized elementary path, applying a second algorithm, based on the respective sanitized elementary path, to obtain a respective labeled elementary path, applying a third algorithm to the respective labeled elementary path to identify at least one pattern, mapping a respective pattern of the at least one pattern to a respective graph subsection, applying a fourth algorithm to the respective graph subsection to assign a weight to the respective graph subsection, and allocating a processing of a workload associated with the respective graph subsection to a resource based on the weight. Other embodiments are disclosed.

20 Claims, 5 Drawing Sheets

(56) References Cited

U.S. PATENT DOCUMENTS

| | | | | |
|---|---|---|---|---|
| 2007/0177518 A1* | 8/2007 | Li | | H04L 43/50 |
| | | | | 370/254 |
| 2008/0155537 A1* | 6/2008 | Dinda | | G06F 9/5077 |
| | | | | 718/1 |
| 2008/0300778 A1* | 12/2008 | Kuznetsov | | G08G 1/096888 |
| | | | | 701/532 |
| 2012/0005236 A1* | 1/2012 | Deng | | G06F 8/10 |
| | | | | 707/E17.011 |
| 2017/0134520 A1* | 5/2017 | Abbasi | | H04L 67/60 |
| 2017/0180220 A1* | 6/2017 | Leckey | | H04L 41/122 |
| 2018/0173173 A1* | 6/2018 | Leonard | | G05B 13/0265 |
| 2018/0343190 A1* | 11/2018 | Hao | | H04L 45/50 |
| 2019/0227777 A1* | 7/2019 | ChoFleming, Jr. | | G06F 8/34 |
| 2019/0229996 A1* | 7/2019 | ChoFleming, Jr. | | |
| | | | | H04L 43/0858 |
| 2020/0293372 A1* | 9/2020 | Haprian | | G06F 11/3006 |
| 2021/0306409 A1* | 9/2021 | Seibel | | H04L 41/40 |
| 2022/0043731 A1* | 2/2022 | Larson | | G06F 11/3452 |
| 2024/0069969 A1* | 2/2024 | Mukundan | | G06F 9/5044 |
| 2024/0070040 A1* | 2/2024 | Viswanath | | G06F 11/26 |
| 2024/0089296 A1* | 3/2024 | Murphy | | H04L 12/1863 |

OTHER PUBLICATIONS

Bisseling, Rob H., "The Bulk Synchronous Parallel Model", Sections 1.1-1.2 of Parallel Scientific Computation, 2nd edition, available at least as of Aug. 14, 2023, 18 pages.
Malewicz, Grzegorz, et al., "Pregel: A System for Large-Scale Graph Processing", https://15799.courses.cs.cmu.edu/fall2013/static/papers/p135-malewicz.pdf, Jun. 6-11, 2010, 11 pages.
Whitley, Darrell, et al., "Scheduling Problems and Traveling Salesman: The Genetic Edge Operator", Proc. of the 3rd Int'l Conf. on GA, 1989, 16 pages.

* cited by examiner

P1: 2 -> 6 -> 5 -> 1 -> 3 -> 4 -> 2 | P2: 2 -> 6 -> 5 -> 3 -> 4 -> 2

P3: 2 -> 5 -> 1 -> 3 -> 4 -> 2 | P4: 2 -> 5 -> 3 -> 4 -> 2

P5: 2 -> 6 -> 5 -> 1 -> 6 | P6: 2 -> 5 -> 1 -> 6 -> 5

P7: 6 -> 5 -> 1 -> 3 -> 4 -> 2 -> 6 | P8: 6 -> 5 -> 3 -> 4 -> 2 -> 6

P9: 5 -> 1 -> 3 -> 4 -> 2 -> 6 -> 5

P10: 1 -> 6 -> 5 -> 1 ....and so on.

APPARATUSES AND METHODS FOR FACILITATING A PATTERN-DRIVEN SCALABLE SCHEDULING FRAMEWORK FOR NETWORK GRAPH WORKLOADS

CROSS-REFERENCE TO RELATED APPLICATIONS

The instant application claims priority to India patent application serial number 202311064303 filed on Oct. 10, 2023. All sections of the aforementioned application are incorporated herein by reference in their entirety.

FIELD OF THE DISCLOSURE

The subject disclosure relates to apparatuses and methods for facilitating a pattern-driven scalable scheduling framework for network graph workloads.

BACKGROUND

Modern graph processing frameworks are leveraging the scale of cloud infrastructure to achieve faster turnaround/execution time. However, existing frameworks lack adaptable techniques for partitioning a graph to determine enhanced (e.g., optimum) scheduling strategies. For example, typically partitions are measured or treated equally for processing, the result being a negative impact on the overall processing time of the graph. Conventional techniques may be useful for homogeneous graph workloads, but such techniques are inefficient in terms of a utilization or allocation of available, scarce resources for heterogeneous graph workloads.

BRIEF DESCRIPTION OF THE DRAWINGS

Reference will now be made to the accompanying drawings, which are not necessarily drawn to scale, and wherein:

FIG. 3 depicts a flowchart of a method in accordance with various aspects described herein.

DETAILED DESCRIPTION

Figure 1:
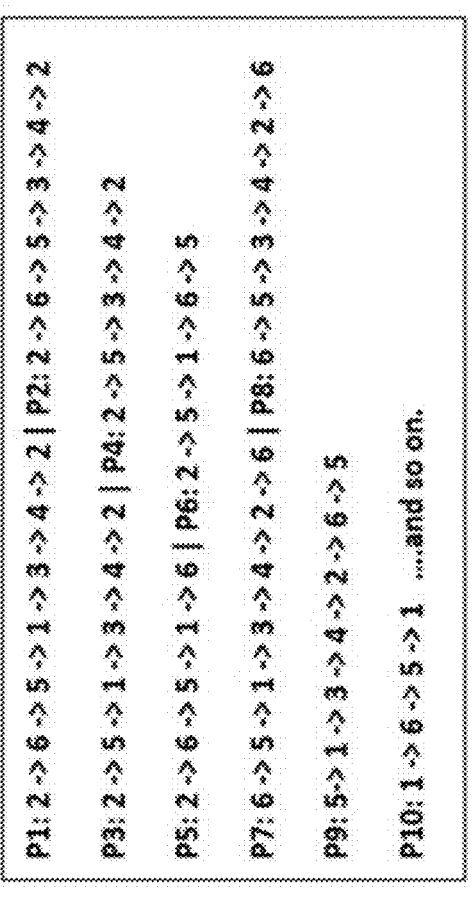
FIG. 1 is a diagram illustrating an exemplary, non-limiting embodiment of a graph and associated paths in accordance with various aspects described herein.
Figure 1:
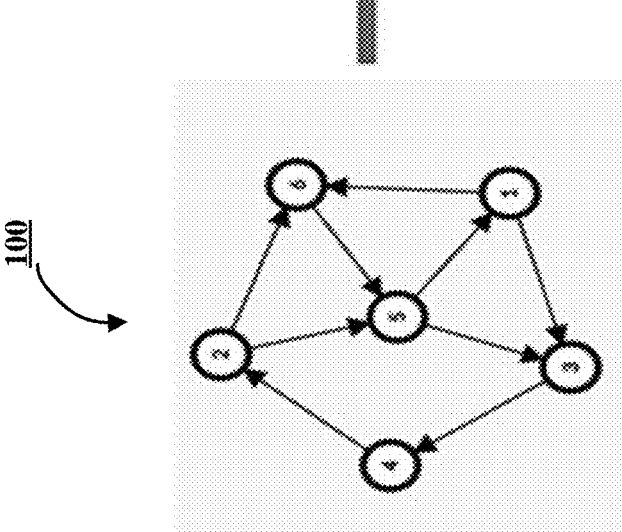

The subject disclosure describes, among other things, illustrative embodiments for allocating resources to process computational loads based on an analysis of parameters or characteristics associated with a graph. Other embodiments are described in the subject disclosure.

One or more aspects of the subject disclosure include, in whole or in part, obtaining a graph; generating, from the graph, a first elementary path and a second elementary path; applying a first rule to the first elementary path to obtain a first sanitized elementary path; applying a second rule to the second elementary path to obtain a second sanitized elementary path; obtaining first attributes associated with the first sanitized elementary path; processing the first attributes in accordance with a first function to generate a first labeled elementary path; obtaining second attributes associated with the second sanitized elementary path; processing the second attributes in accordance with a second function to generate a second labeled elementary path; identifying a first plurality of patterns in the first labeled elementary path; identifying a first plurality of graph subsections included in the graph based on the first plurality of patterns; identifying a second plurality of patterns in the second labeled elementary path; identifying a second plurality of graph subsections included in the graph based on the second plurality of patterns; and allocating a respective workload associated with each graph subsection included in the first plurality of graph subsections and the second plurality of graph subsections to a respective resource based on a respective weight that is applied to each graph subsection.

One or more aspects of the subject disclosure include, in whole or in part, obtaining a graph; applying a first algorithm to the graph to obtain at least one elementary path; applying a second algorithm, based on the at least one elementary path, to obtain at least one labeled elementary path; applying a third algorithm to the at least one labeled elementary path to identify at least one pattern; mapping the at least one pattern to at least one graph subsection; applying a fourth algorithm to the at least one graph subsection to assign at least one weight to the at least one graph subsection; and allocating a processing of a workload associated with the at least one graph subsection to a resource based on the at least one weight.

One or more aspects of the subject disclosure include, in whole or in part, obtaining a graph; applying a first algorithm to the graph to obtain at least one elementary path; applying a rule to each of the at least one elementary path to obtain a respective sanitized elementary path; applying a second algorithm, based on the respective sanitized elementary path, to obtain a respective labeled elementary path; applying a third algorithm to the respective labeled elementary path to identify at least one pattern; mapping a respective pattern of the at least one pattern to a respective graph subsection; applying a fourth algorithm to the respective graph subsection to assign a weight to the respective graph subsection; and allocating a processing of a workload associated with the respective graph subsection to a resource based on the weight.

By way of introduction, aspects of this disclosure may provide a framework or platform to facilitate a partitioning (e.g., a division) of a network or system graph into different subsections based on user-defined patterns. For example, the framework/platform may obtain a network graph along with a file (e.g., a pattern templates file) as input and run through/execute/apply one or more algorithms to determine individual subsections (or, analogously, portions of a workload) that can be separately or independently scaled for processing.

As described herein, a graph may include nodes and edges. A directed graph may correspond to a graph where the edges have a directional or orientational property associated therewith, whereas the edges of a non-directed graph (also referred to herein as an undirected graph) may lack such a directional or orientational property associated with the edges. In this respect, a traversal from node A to node B along a first edge in a directed graph may be different from a traversal from node B to node A along a second edge in that same directed graph. Conversely, in a non-directed graph, no such distinction/difference may exist between the traversals along the first and second edges between the node A and the node B.

In some embodiments a node may be associated with, or defined by, one or more parameters or fields. Illustratively, a node may be associated with the parameters: (a) ID, (b) Ingress degrees, (c) Egress degrees, (d) Characteristics, and (e) Properties. The ID may correspond to a unique identifier of the node in the graph. The Ingress degrees may correspond to the set of edges entering the node. The Egress degrees may correspond to the set of edges exiting/departing from the node. Assuming that the node (analogously, graph) is associated with an optical network or system, the Characteristics may illustratively be defined as (d1) Channel Mux—A1, (d2) Channel Demux—A2, (d3) Pass through—A3, (d4) Glass through—A4, (d5) Amplifier—A5, (d6) Regeneration—A6. The Properties may illustratively be defined as (e1) Insertion loss, (e2) Gain, (e3) Signal noise, (e4) Input and Output signal power. The foregoing represents examples of the types of parameters and fields (and even sub-parameters/sub-fields) that may be associated with a given node, which is to say that other types of parameters or fields may be utilized or included in a given embodiment.

In some embodiments an edge may be associated with, or defined by, one or more parameters or fields. Illustratively, an edge may be associated with the parameters: (a) AEnd Node ID, (b) ZEnd Node ID, and (c) Properties. The AEnd Node ID may correspond to a unique identifier of the starting node of the edge. The ZEnd Node ID may correspond to a unique identifier of the ending/end node of the edge. Assuming that the edge (analogously, graph) is associated with an optical network or system, the Properties may illustratively be defined as (c1) Loss, (c2) Margins. The foregoing represents examples of the types of parameters and fields (and even sub-parameters/sub-fields) that may be associated with a given edge, which is to say that other types of parameters or fields may be utilized or included in a given embodiment.

In accordance with aspects of this disclosure, and in order to scale out the workloads of a graph (or one or more portions thereof), a pattern may be defined as the semantics of a subsection of a graph that demonstrate some common characteristics (e.g., common optical characteristics in the case of a graph pertaining to an optical network or system). Based in part on domain or subject matter expertise, multiple patterns may be defined for a given graph (or, analogously, network or system). To illustrate, Table 1 shown below is a Table of Patterns in accordance with aspects of this disclosure.

TABLE 1

Sample Pattern Templates

| Pattern Template ID | Pattern Semantics | Crawling Constraints | Pattern Start Label | Pattern End Label | Predictive Compute Weight (0 < w <= 1) |
|---|---|---|---|---|---|
| P1 | Backbone | Topological connectivity of participating nodes | Label A | Label B | 0.9 |
| P2 | Cross-connect | Topological connectivity of participating nodes | Label X | Label Y | 0.1 |

A particular row in Table 1 above may correspond to a unique pattern in a graph based on one or more characteristics (e.g., optical characteristics) of participating nodes in the pattern. For example, the first pattern (denoted by ID P1) in Table 1 may denote graph subsections that begin with a node with the label 'A' and end with a node with the label 'B'. More generally, Table 1 includes: (1) a Pattern Template ID, which serves as a unique identifier of a pattern, (2) Pattern Semantics, which serves as a user-defined name of a pattern, (3) Crawling Constraints, which correspond to a set of constraints to follow or adhere to while searching for patterns, (4) Label, which corresponds to one or more attributes of a node that can be used as a label, and (5) Predictive Compute Weight. In respect of the (4) Label, Table 1 above includes a Pattern Start Label and a Pattern End label, corresponding to the pattern's starting node label and ending node label, respectively. In respect of the (5) Predictive Compute Weight, the value contained therein may denote a complexity of the pattern, normalized to a range of values between 0 and 1. Table 1 represents an example of pattern templates that may be utilized or present in a given embodiment, which is to say that other patterns or templates may be utilized or included, and the count or types of values (e.g., columns) may be different from what is shown above. Information pertaining to the Table 1 may be stored or included as part of one or more files.

In some embodiments, a problem statement may be evaluated to generate a customized dataset. In an example (corresponding to Table 2 below), a dataset may correspond to a unique label that may be derived via one or more functions (e.g., hashing function) defined for the label.

TABLE 2

Sample Label Dataset

| Label | Participating node attributes | Hashing functions f(Participating node attributes) | Hashed Value |
|---|---|---|---|
| A | A1, A2 | h(A1A2) | X |
| B | A1, A2 | h(A1A2) | Y |
| C | A1, A2, A3 | h(A1A2A3) | P |
| D | A1, A2, A3 | h(A1A2A3) | Q |

In Table 2 above, each value in the column Label may correspond to or include text (or other symbology) representing a node. The column Participating node attributes may correspond to or include characteristics of the node, illustratively represented as A1, A2, A3, etc. The column Hashing functions may represent hashing functions that may be defined to map the characteristics to labels. The column Hash Value may represent the output of the hashing function(s) when applied on the characteristics/attributes of the node. Aspects of Table 2 may be stored or included as part of one or more files.

As referenced above, aspects of this disclosure may provide a framework or platform for scalable scheduling strategies for graphs/graph workloads. Processing of the graphs/graph workloads may be based on one or more principles, such as (A) procedures to partition a graph into multiple subsections using user-defined patterns or pre-trained models, (B) procedures to convert the subsections into weighted tasks, and/or (C) a scheduling of tasks using a subsection processing strategy (SPS). In respect of (A), elementary paths may be determined/identified/obtained using one or more algorithms (e.g., Johnson's algorithm), the elementary paths may be processed based on predefined rules and/or converted into labelled elementary paths using a label generation algorithm, and pattern recognition techniques may be applied to the paths using, e.g., a so-called inchworm strategy. In respect of (B), predictive compute weights and/or pattern complexity factors may be applied to assign or determine task weights. In respect of (C), a subsection predictive compute coefficient (SPCC) may be computed to determine the SPS. Each of (A)-(C) referenced above is described in further detail below.

As set forth above, one or more algorithms may be utilized/defined to determine/identify an elementary path from a graph (e.g., a directed network graph). An elementary path may include a simple cycle or a linear path starting from a node and ending at a terminus node. As used herein, a terminus node may correspond to a node without any egress degrees. With reference to FIG. 1, an exemplary directed graph 100 is shown that includes six nodes (labeled as nodes 1 through 6). A processing of the graph 100 may yield an identification of one or more paths, such as the paths denoted as P1, P2, P3, P4, P5, P6, P7, P8, P9, and P10. The paths P1 through P10 may correspond to, or include, elementary paths. To generate the elementary paths, one or more cycle detection algorithms (e.g., Johnson's algorithm) may be used to identify simple cycles in the graph 100, all possible linear paths may be identified, and overlapping ones of the linear paths (or sub-paths) may be removed/discarded as appropriate or necessary.

Figure 2A:
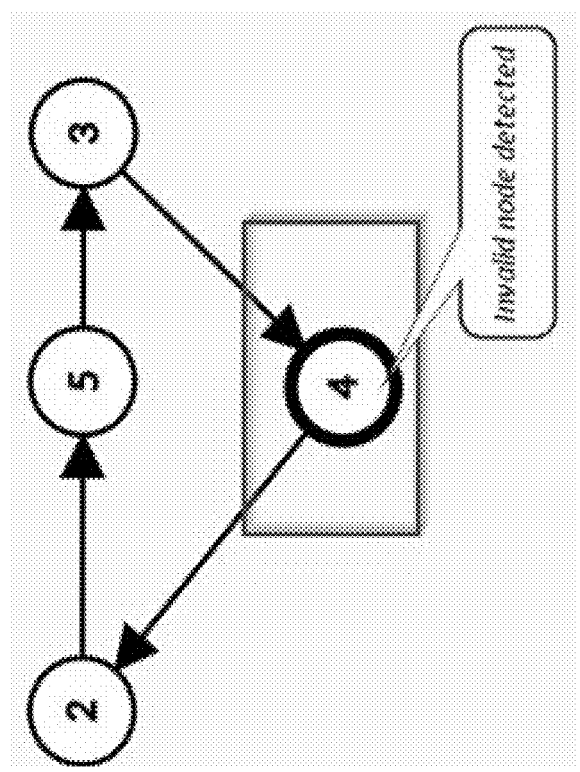
FIG. 2A depicts a portion of the graph of FIG. 1 that is processed via a rule in accordance with various aspects described herein.

Once the elementary paths have been obtained, the elementary paths may be processed in accordance with one or more rules. The processing via the rules may serve to verify or validate that a node (or analogously, edge) has any predefined, mandatory attributes corresponding to a label in a pattern templates file or the like. For example, and referring briefly to FIG. 2A, a portion of the graph 100 of FIG. 1 is shown, whereby the node '4' has been flagged or identified as an invalid node based on the processing in accordance with the rules.

Figure 2B:
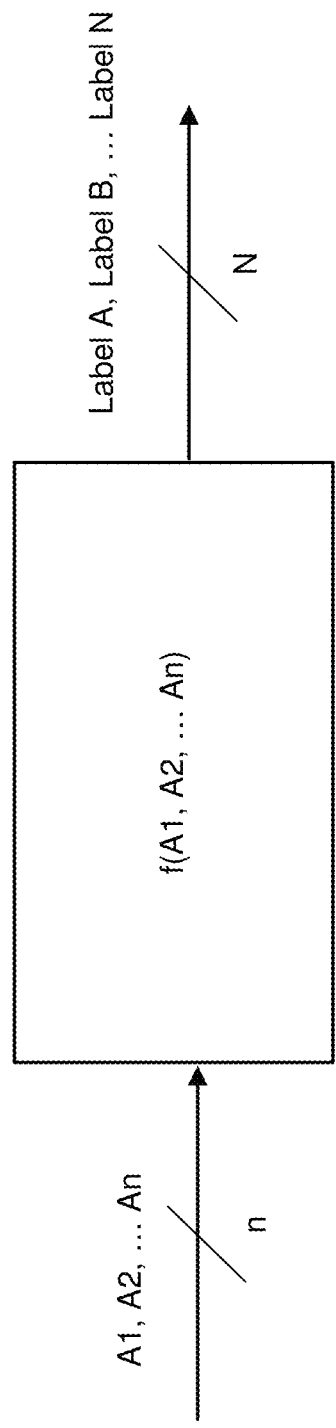
FIG. 2B depicts a block diagram of a system for generating labels for nodes of a path from attributes in accordance with various aspects described herein.

Next, a node label generation algorithm may be applied to the elementary paths (those elementary paths having potentially been subjected to the processing via the rules as described above). For example, and for each node of an elementary path, the node's label value may be determined by passing the set of attributes participating in the label generation to one or more functions (e.g., hashing functions). To demonstrate, and referring to FIG. 2B (see also Table 2 and its associated description above), a label generation algorithm 'f' is depicted whereby input attributes A1, A2, . . . An are acted upon/processed to generate output labels (denoted as Label A, Label B, . . . Label N in FIG. 2B) for each node of the subject elementary path. In this respect, and again with reference to Table 2 above, a binding or mapping may exist between the output values (e.g., hashed values) of the function/algorithm 'f' and the representation corresponding to the labels.

The labeled elementary paths may be subjected to a strategy (e.g., referred to as an inchworm strategy herein), or algorithm, to break-down or allocate the paths to patterns. The strategy/algorithm may begin by creating/generating sets of empty collections, illustratively referred to as generatedPatterns and candidatePatterns. Path crawling may be initiated from a first, start/starting node of a labelled elementary path. As part of the path crawling, a scan (or, analogously, a comparison) may be performed relative to patterns in a pattern templates file (see, e.g., Table 1 above in respect of sample patterns that might be included as part of such a file) and all of the candidate patterns that can be initiated from the start node may be identified and included within the candidatePatterns. The next nodes in the labelled elementary path may be processed, in turn, based on crawling constraints. For example, if a current node in the iteration violates a constraint (as defined in the pattern templates file), the corresponding pattern may be removed from the candidatePatterns. Otherwise, if no such violations of constraints are detected/identified (in iterating from the start node to the end/terminus node) the pattern may be copied/promoted from the candidatePatterns to the generatedPatterns. The foregoing techniques may be applied to each labelled elementary path included in a set of elementary paths in generating the set of generatedPatterns, such that the count of patterns included in the generatedPatterns may be less than, or equal to, the count of patterns included in the candidatePatterns.

For each pattern included in the set of generatedPatterns (following the processing associated with the path crawling described above), a procedure or process may be executed to map the pattern to a graph subsection, the graph subsection corresponding to a portion of the overall graph. To the extent that there are any interdependencies between graph subsections, the same may be included or identified as part of a dependency graph. To illustrate, if an output of graph subsection A is an input of another graph subsection B, graph subsection B may be made a child of graph subsection A in the dependency graph.

A subsection predictive compute coefficient (SPCC) may be computed for each graph subsection. For example, the SPCC may be computed as the product of a pattern predictive compute weightage (PPCW) and a cumulative pattern complexity factor (CPCF). The PPCW may be obtained from a pattern template file for a given pattern (and thus, for the given graph subsection, given the mapping between patterns and graph subsections set forth above). In an illustrative example, the CPCF may be a function of a number of spans (or edges) in the graph subsection and an average weight of the spans (or edges) of the graph subsection. For example, the product of the number of spans and the average weight may yield/generate the CPCF. Other formulations for the CPCF may be used in various embodiments.

The SPCC may be used to determine or generate the subsection processing strategy (SPS). For example, the SPS may serve to allocate each graph subsection to one or more computing/computational resources (e.g., servers or other hosts) in accordance with the SPCC for that graph subsection. Thus, the SPCC may be used to allocate scarce resources efficiently, while at the same time enhancing (e.g., optimizing) throughput. Stated differently, the SPS may strike an appropriate balance between attempting to maximize throughput on the one hand, while at the same time allocating processing loads (as fairly represented by the graph subsections) efficiently on the other hand in respect of an available pool of resources. Furthermore, the resources may be assigned/allocated amongst the graph subsections efficiently/fairly, based on the computational intensity/load of each graph subsection (on an absolute or relative basis).

Figure 3:
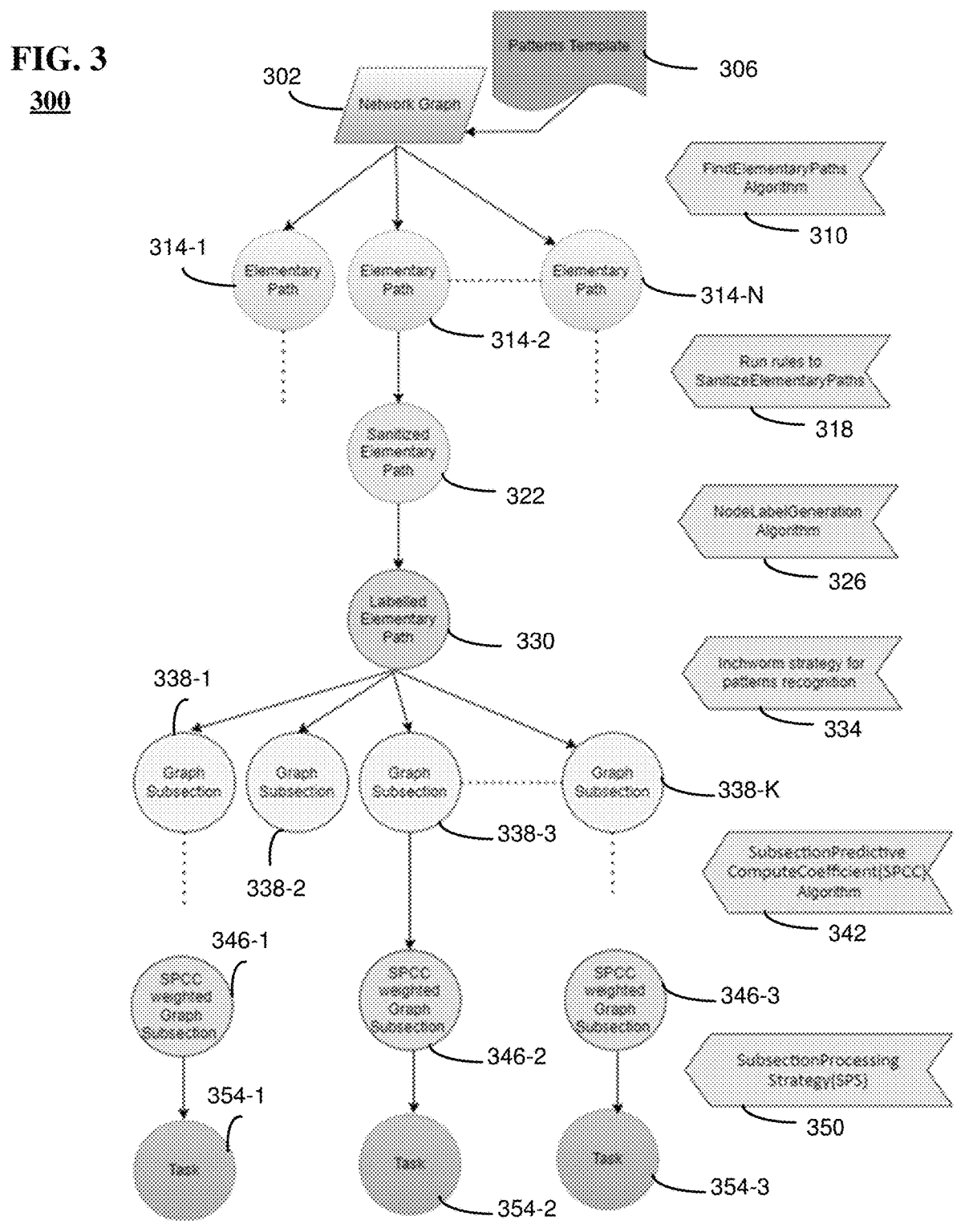

Referring now to FIG. 3, a flowchart depicting an illustrative embodiment of a method 300 in accordance with various aspects described herein is shown. The method 300 may be implemented (e.g., executed), in whole or in part, in conjunction with one or more systems, networks, devices, and/or components, such as for example the systems, networks, devices, and components set forth herein. The method 300 may be implemented to allocate portions of a graph to one or more resources, such as for example resources of a cloud computing network. Functionality associated with the method 300 is described below in relation to the blocks (or more generally, objects) shown in FIG. 3. In some embodiments, parts/portions of an object may be implemented as one or more instructions that may be executed in conjunction with one or more processing systems, where a given processing system may include one or more processors.

As part of the method 300, a network graph 302 may be obtained. The network graph 302 may correspond to any type of entity that may be subject to analysis, such as a communication network or communication system, a vehicular network including vehicles or supporting elements/infrastructure (such as traffic lights), satellites, spacecraft, marine vessels, etc. The network graph 302 may be associated with a patterns template 306 that may define patterns and/or other attributes or properties.

The network graph 302 may be processed (see 310) to generate one or more elementary paths, such as a first elementary path 314-1, a second elementary path 314-2, . . . and an Nth elementary path 314-N. The processing of 310 may conform to/with (one or more principles of) one or more algorithms, such as Johnson's algorithm. In some embodiments, modifications/adaptations may be made to such algorithms to meet/satisfy particular needs, circumstances, or requirements.

The elementary paths 314-1 through 314-N may be subjected to processing via an application of one or more rules as part of 318 to generate a respective sanitized elementary path. See, e.g., the sanitized elementary path 322 corresponding to the elementary path 314-2 as an example of the output of the processing of 318.

The sanitized elementary paths (obtained via 318) may be processed (see 326) to generate labels for the paths. See, e.g., the labeled elementary path 330 corresponding to the sanitized elementary path 322 as an example of the output of the processing of 326.

The labeled elementary paths (obtained via 326) may be processed (see 334) to generate or identify one or more patterns (or, analogously, one or more graph subsections). See, e.g., the K graph subsections 338-1, 338-2, 338-3, . . . 338-K corresponding to the labeled elementary path 330 as an example of the output of the processing 334. In this regard, it is noted that the processing of 334 may correspond to the strategy (e.g., the inchworm strategy) described above, which in turn may be dependent or based on the patterns of the patterns template 306.

Each of the graph subsections 338-1 through 338-K may be subject to processing (see 342) to generate a SPCC weighted graph subsection. See, e.g., SPCC weighted graph subsection 346-1 corresponding to graph subsection 338-1, SPCC weighted graph subsection 346-2 corresponding to graph subsection 338-3, and SPCC weighted graph subsection 346-3 corresponding to graph subsection 338-K.

The SPCC weighted graph subsections may be processed (see 350) to generate tasks or task assignments. See, e.g., the task 354-1 (corresponding to the SPCC weighted graph subsection 346-1), the task 354-2 (corresponding to the SPCC weighted graph subsection 346-2), and the task 354-3 (corresponding to the SPCC weighted graph subsection 346-2) as examples of the output of the processing 350. The tasks 354-1 through 354-3 may include an identification of resources that are assigned or allocated to process the load/workload associated with the respective SPCC weighted graph subsection. In this regard, it is noted that the values associated with each SPCC may correspond to a respective weight that may be used to derive or drive the respective allocations/assignments.

While for purposes of simplicity of explanation, the respective processes are shown and described as a series of blocks or objects in FIG. 3, it is to be understood and appreciated that the claimed subject matter is not limited by the order of the blocks/objects, as some blocks/objects may occur in different orders and/or concurrently with other blocks/objects from what is depicted and described herein. Moreover, not all illustrated blocks/objects may be required to implement the methods described herein.

As demonstrated herein, aspects of this disclosure may be applied to, and integrated within, a multitude of practical applications involving networks and systems and devices and components. For example, aspects of this disclosure may be integrated as part of multi-layer networks, graph analytics systems/applications, intelligent vehicle route planning technologies, network/system traffic management, financial transaction networks, etc. Aspects of this disclosure may be applied in respect of a graph workload, or compute/computational function, associated with one or more nodes or edges of a graph. Parallel processing techniques may be utilized or applied to enhance efficiency (e.g., throughput) in terms of task execution or management. Tasks or task types may be defined based on application requirements or specifications. To demonstrate, in some embodiments a graph workload may be associated with a link-budget computation on one or more subsections of a graph. Other types of tasks that may be supported may include optimization functions (for, e.g., multi-layer networks), offline analytics (for, e.g., financial transaction graphs), mathematical equations, convergence tests, etc.

Furthermore, aspects of this disclosure may represent substantial improvements to technology. As described above, aspects of this disclosure may strike an appropriate balance between throughput and efficient resource utilization in respect of processing workloads. In this manner, and as one skilled in the art will appreciate based on a review of this disclosure, the various aspects of this disclosure are not directed to abstract ideas. To the contrary, the various aspects of this disclosure are directed to, and encompass, significantly more than any abstract idea standing alone.

Figure 4:
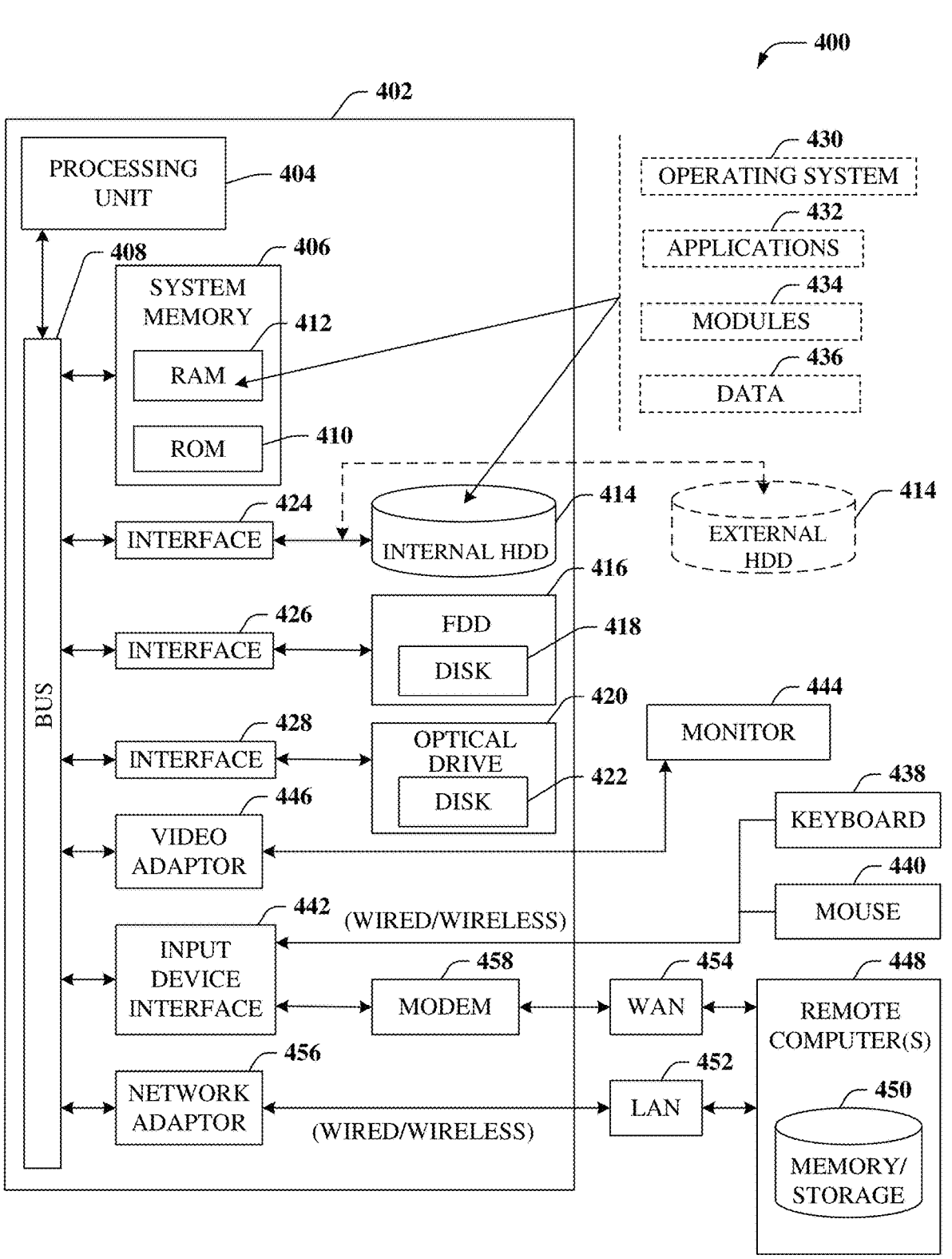
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, the computing environment 400 can facilitate, in whole or in part, obtaining a graph, generating, from the graph, a first elementary path and a second elementary path, applying a first rule to the first elementary path to obtain a first sanitized elementary path, applying a second rule to the second elementary path to obtain a second sanitized elementary path, obtaining first attributes associated with the first sanitized elementary path, processing the first attributes in accordance with a first function to generate a first labeled elementary path, obtaining second attributes associated with the second sanitized elementary path, processing the second attributes in accordance with a second function to generate a second labeled elementary path, identifying a first plurality of patterns in the first labeled elementary path, identifying a first plurality of graph subsections included in the graph based on the first plurality of patterns, identifying a second plurality of patterns in the second labeled elementary path, identifying a second plurality of graph subsections included in the graph based on the second plurality of patterns, and allocating a respective workload associated with each graph subsection included in the first plurality of graph subsections and the second plurality of graph subsections to a respective resource based on a respective weight that is applied to each graph subsection. The computing environment 400 can facilitate, in whole or in part, obtaining a graph, applying a first algorithm to the graph to obtain at least one elementary path, applying a second algorithm, based on the at least one elementary path, to obtain at least one labeled elementary path, applying a third algorithm to the at least one labeled elementary path to identify at least one pattern, mapping the at least one pattern to at least one graph subsection, applying a fourth algorithm to the at least one graph subsection to assign at least one weight to the at least one graph subsection, and allocating a processing of a workload associated with the at least one graph subsection to a resource based on the at least one weight. The computing environment 400 can facilitate, in whole or in part, obtaining a graph, applying a first algorithm to the graph to obtain at least one elementary path, applying a rule to each of the at least one elementary path to obtain a respective sanitized elementary path, applying a second algorithm, based on the respective sanitized elementary path, to obtain a respective labeled elementary path, applying a third algorithm to the respective labeled elementary path to identify at least one pattern, mapping a respective pattern of the at least one pattern to a respective graph subsection, applying a fourth algorithm to the respective graph subsection to assign a weight to the respective graph subsection, and allocating a processing of a workload associated with the respective graph subsection to a resource based on the weight.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. In some embodiments, instances of elements may be distinguished or differentiated from one via the terms "first", "second", "third", and the like. The instances may correspond to a same or similar type, or may correspond to different types.

What is claimed is:

1. A non-transitory machine-readable medium, comprising executable instructions that, when executed by a processing system including a processor, facilitate performance of operations, the operations comprising:

obtaining at least one elementary path from a graph;

based on the at least one elementary path, obtaining a respective labeled elementary path;

identifying at least one pattern based on the respective labeled elementary path;

mapping a respective pattern of the at least one pattern to a respective graph subsection;

assigning a weight to the respective graph subsection; and allocating a processing of a workload associated with the respective graph subsection to a resource of a pool of resources based on the weight.

2. The non-transitory machine-readable medium of claim 1, wherein the at least one elementary path includes a plurality of elementary paths.

3. The non-transitory machine-readable medium of claim 2, wherein the respective labeled elementary path is based on a respective elementary path of the plurality of elementary paths.

4. The non-transitory machine-readable medium of claim 1, wherein the operations further comprise:

processing the at least one elementary path in accordance with at least one rule to obtain a respective sanitized elementary path, wherein the obtaining of the respective labeled elementary path is based on the respective sanitized elementary path.

5. The non-transitory machine-readable medium of claim 4, wherein the at least one elementary path includes a plurality of nodes, and wherein the processing the at least one elementary path in accordance with the at least one rule validates that each node of the plurality of nodes is associated with at least one attribute of a plurality of attributes.

6. The non-transitory machine-readable medium of claim 1, wherein the obtaining of at least one elementary path conforms to a principle of Johnson's algorithm.

7. The non-transitory machine-readable medium of claim 1, wherein the at least one elementary path includes a plurality of nodes, and wherein the obtaining of the respective labeled elementary path comprises:

passing at least one attribute associated with each node of the plurality of nodes to a hashing function to generate a plurality of hashed values; and mapping each hashed value of the plurality of hashed values to a label to generate a plurality of labels, each label of the plurality of labels corresponding to a node of the plurality of nodes.

8. The non-transitory machine-readable medium of claim 1, wherein the identifying of the at least one pattern comprises:

comparing the respective labeled elementary path to each of a plurality of paths in a file; and determining, based on the comparing, that a match exists between the respective labeled elementary path and a path included in the plurality of paths.

9. The non-transitory machine-readable medium of claim 1, wherein the respective graph subsection is less than an entirety of the graph.

10. The non-transitory machine-readable medium of claim 1, wherein the assigning of the weight comprises:

computing the weight based on a first value and a second value, the first value corresponding to the at least one pattern.

11. The non-transitory machine-readable medium of claim 10, wherein the second value is based on a number of edges in the respective graph subsection and an average weight of each edge of the edges, and wherein the computing of the weight comprises multiplying the first value by the second value to generate the weight.

12. The non-transitory machine-readable medium of claim 1, wherein the resource comprises a server of a cloud computing network, and wherein the graph pertains to an optical communication network.

13. The non-transitory machine-readable medium of claim 1, wherein the graph pertains to a vehicular network.

14. A method, comprising:

obtaining at least one elementary path from a graph;

based on the at least one elementary path, obtaining a respective labeled elementary path;

identifying at least one pattern based on the respective labeled elementary path;

mapping a respective pattern of the at least one pattern to a respective graph subsection;

assigning a weight to the respective graph subsection; and allocating a processing of a workload associated with the respective graph subsection to a resource of a pool of resources based on the weight.

15. The method of claim 14, wherein the respective graph subsection includes a first graph subsection and a second graph subsection, wherein the weight includes a first weight associated with the first graph subsection and a second weight associated with the second graph subsection, wherein the workload includes a first workload associated with the first graph subsection and a second workload associated with the second graph subsection, and wherein the resource includes a first machine that is assigned to process the first workload based on the first weight and the second weight and a second machine that is assigned to process the second workload based on the first weight and the second weight.

16. The method of claim 14, wherein the resource comprises servers of a cloud computing network, and the graph pertains to a wireless communication network.

17. The method of claim 14, further comprising:

processing the at least one elementary path in accordance with at least one rule to obtain a respective sanitized elementary path, wherein the obtaining of the respective labeled elementary path is based on the respective sanitized elementary path.

18. A device, comprising:

a processing system including a processor; and a memory that stores executable instructions that, when executed by the processing system, facilitate performance of operations, the operations comprising:

obtaining at least one elementary path from a graph;

based on the at least one elementary path, obtaining a respective labeled elementary path;

identifying at least one pattern based on the respective labeled elementary path;

mapping a respective pattern of the at least one pattern to a respective graph subsection;

assigning a weight to the respective graph subsection; and allocating a processing of a workload associated with the respective graph subsection to a resource of a pool of resources based on the weight.

19. The device of claim 18, wherein the respective graph subsection includes a first graph subsection and a second graph subsection, wherein the allocating comprises allocating a first portion of the workload associated with the first graph subsection to a first server included in the resource and allocating a second portion of the workload associated with the second graph subsection to a second server included in the resource, and wherein the first server and the second server are part of a cloud computing network.

20. The device of claim 18, wherein the operations further comprise:

processing the at least one elementary path in accordance with at least one rule to obtain a respective sanitized elementary path, wherein the obtaining of the respective labeled elementary path is based on the respective sanitized elementary path.

* * * * *